(12) United States Patent
Farrar et al.

(10) Patent No.: US 7,563,130 B2
(45) Date of Patent: Jul. 21, 2009

(54) CABLE MANAGEMENT TECHNIQUES FOR POWER CONVERTERS

(75) Inventors: Karin M. Farrar, San Jose, CA (US); Steve I. Hwang, San Francisco, CA (US); Mark Telefus, Orinda, CA (US)

(73) Assignee: Flextronics AP, LLC, Broomfield, CO (US)

(*) Notice: Subject to any disclaimer, the term of this patent is extended or adjusted under 35 U.S.C. 154(b) by 262 days.

(21) Appl. No.: 11/419,949

(22) Filed: May 23, 2006

(65) Prior Publication Data
US 2006/0262578 A1 Nov. 23, 2006

Related U.S. Application Data

(60) Provisional application No. 60/683,576, filed on May 23, 2005.

(51) Int. Cl.
*H01R 13/72* (2006.01)
(52) U.S. Cl. .................. 439/501; 320/111; 320/114
(58) Field of Classification Search .............. 320/111, 320/112, 114; 439/501, 502, 504
See application file for complete search history.

(56) References Cited

U.S. PATENT DOCUMENTS

| 6,325,665 | B1 | 12/2001 | Chung | |
|---|---|---|---|---|
| 6,428,348 | B1 | 8/2002 | Bean | |
| 6,589,069 | B1 | 7/2003 | Liao | |
| D482,654 | S * | 11/2003 | Shor et al. | D13/110 |
| 6,722,900 | B2 * | 4/2004 | Segawa et al. | 439/131 |
| 6,733,328 | B2 | 5/2004 | Lin et al. | |
| 6,909,259 | B2 | 6/2005 | Chung | |
| 2003/0008550 | A1 * | 1/2003 | Tse et al. | 439/501 |
| 2003/0181105 | A1 * | 9/2003 | Lee | 439/638 |
| 2005/0046385 | A1 * | 3/2005 | Chung | 320/114 |
| 2005/0180736 | A1 | 8/2005 | Zobele | |

* cited by examiner

*Primary Examiner*—Akm E Ullah
*Assistant Examiner*—Ramy Ramadan
(74) *Attorney, Agent, or Firm*—Robert G. Crouch; Libby A. Huskey; Marsh Fischmann & Breyfogle (57) ABSTRACT

A variety of arrangements for management of DC power cords in AC-to-DC power converters. These arrangements include a frame for wrapping the cord around, in which the AC power plug may or may not be pivotably attached to the frame. The AC-to-DC power conversion circuitry may be miniaturized and contained within either the AC power plug or the frame. In addition, other arrangements include a retractable reel for the DC power cord that may be located within the frame or within the AC power plug.

12 Claims, 7 Drawing Sheets

CABLE MANAGEMENT TECHNIQUES FOR POWER CONVERTERS

CROSS-REFERENCE TO RELATED APPLICATIONS

This application claims priority from U.S. Provisional Patent Application No. 60/683,576, entitled "Cable Management Techniques for Cell Phone Chargers," filed May 23, 2005, the contents of which are incorporated herein by reference.

BACKGROUND

Many modern consumer devices include a power converter associated with the power cable for converting AC outlet power to DC power used by the consumer device. This is particularly the case with portable and rechargeable consumer devices. These may typically include either (1) a converter located with the plug that interfaces with the AC wall outlet (e.g., occupying a volume of approximately 3"×2"×2"); or (2) a converter located at an intermediate position between the AC plug and the consumer device (e.g., occupying a volume of approximate 5"×2"×1").

These large housings and the power cords associated with them are sometimes inconvenient for persons who need to use these consumer devices in mobile applications. Not only is the large volume of the housing undesirable, but the amount of loose cord is undesirable and burdensome to users.

Cellular telephones typically have a rechargeable battery that can be charged by a phone charger or power cord that includes a power converter therein, as described above. It is highly desirable to provide a more convenient phone charger for consumers.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

One aspect relates to an AC-to-DC power converter. The converter includes an AC power plug, adapted for mating engagement with an AC power outlet; a cord housing to which the AC power plug is attached; a DC power cord having a DC power plug at one end thereof, adapted for mating engagement with a DC power inlet; a retraction mechanism attached to the DC power cord that resiliently urges the DC power cord into the housing; and AC-to-DC power conversion circuitry electrically connected between the AC power plug and the DC power cord.

The AC power plug may be pivotably attached to the cord housing. The AC power plug may include a plurality of prongs, wherein the cord housing may include a frame defining a central void into which the prongs are received when the AC power plug is pivoted a sufficient amount. The AC power plug may be pivoted through an angular extent of 360 degrees. The AC power plug may be pivoted through an angular extent of approximately 180 degrees. The retraction mechanism may include retraction of the DC power cord through a pivot point for the AC power plug. The retraction mechanism may be separated from the AC power plug.

Another aspect relates to an AC-to-DC power converter that includes a housing; AC power prongs extending from the housing, the prongs adapted for mating engagement with an AC power outlet; a DC power cord having a DC power plug at one end thereof, adapted for mating engagement with a DC power inlet; a retraction mechanism within the housing that resiliently urges the DC power cord into the housing; and AC-to-DC power conversion circuitry located within the housing, the circuitry electrically connected between the AC power prongs and the DC power cord.

The housing may be generally box-shaped. The box-shaped housing may have six substantially equally-sized walls. The walls may generally solid, with an opening in one wall to allow the DC power cord to extend therethrough and openings in another wall to allow the AC power prongs to extend therethrough. The one wall and the another wall may be on opposite faces of the box-shaped housing.

Another aspect relates to an AC-to-DC power converter that includes an AC power plug, adapted for mating engagement with an AC power outlet; a frame to which the AC power plug is pivotably attached; a DC power cord having a DC power plug at one end thereof, adapted for mating engagement with a DC power inlet; and AC-to-DC power conversion circuitry electrically connected between the AC power plug and the DC power cord; wherein the frame is adapted for manually wrapping the DC power cord there around.

The frame may define a central void into which a plurality of prongs of the AC power plug can be received when the AC power plug is sufficiently pivoted. The frame may include raised features on outer opposite sides thereof to act as cord guides to aid in wrapping the DC power cord around the frame. The pivotable attachment of the AC power plug to the frame may allow the frame to hang downward in a generally vertical orientation when the AC power plug is engaged with a generally vertical AC power outlet. When the frame hangs downward in this fashion, it may be adapted for grasping by a user to engage or disengage the AC power plug from the AC power outlet.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Reference will now be made to the accompanying drawings, which assist in illustrating the various pertinent features of the present invention. Although the present invention will now be described primarily in conjunction with cell phone chargers, it should be expressly understood that the present invention may be applicable to other applications where cable management is required/desired. In this regard, the following description of a cell phone charger is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figures 1, 2:
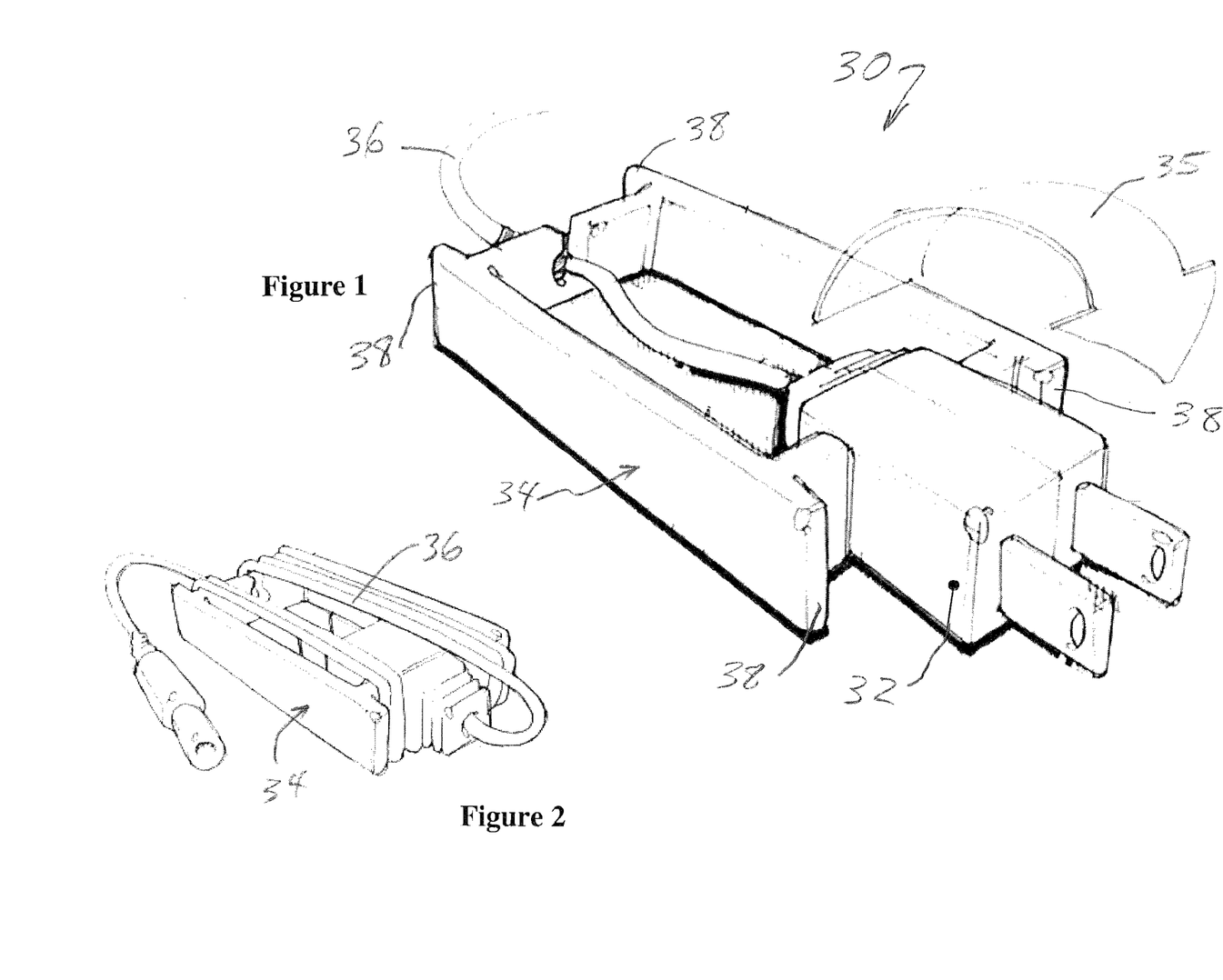
FIG. 1 is a perspective view of a cord management frame for wrapping power cord there around.
FIG. 2 is another perspective view of the frame of FIG. 1 with an AC power plug having pivoted into a storage position, and with a DC power cord having been wrapped there around.
Figures 3, 4, 5, 6:
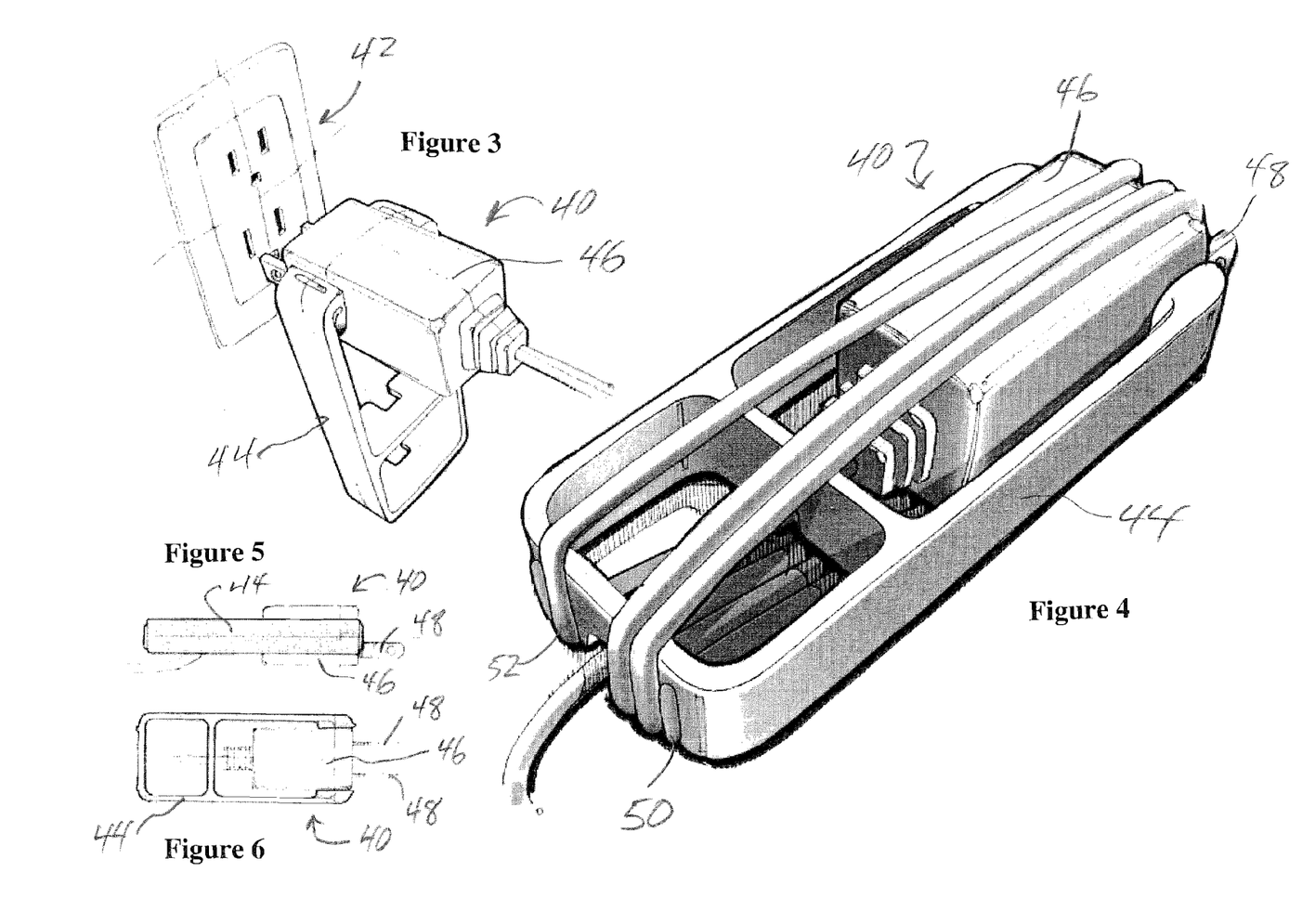
FIG. 3 is a perspective view of an alternative embodiment of a cord management frame for wrapping power cord there around, the frame hanging downward as an AC power plug is engaged with an AC power outlet.
FIG. 4 is another perspective view of the frame of FIG. 3, showing a DC power cord wrapped around the frame.
FIG. 5 is a side view of the frame of FIG. 3.
FIG. 6 is a top view of the frame of FIG. 3.

One technique for managing the power cable associated with a cell phone charger 30 is shown in FIGS. 1 and 2. In this technique, the AC-to-DC power converter circuitry for converting AC wall power to the DC power required by a cell phone has been miniaturized and placed into a wall plug 32 that is only slightly oversized from a standard two-pronged wall plug. Such circuitry is well known to those of skill in the art. A small, light-weight, relatively inexpensive, cable management frame 34 is pivotably mounted to the wall plug 32 as seen in FIG. 1. The frame 34 may be composed of plastic, for example. FIG. 1 shows one scenario in which the plug 32 is in a position with the prongs extending therefrom so as to be in position to mate with a wall outlet. FIG. 2 shows another scenario in which the plug 32 has been pivoted relative to the frame 34 so that the prongs are within the interior of the frame 34. The arrow 35 in FIG. 1 shows the direction the power plug 32 can be pivoted in to move it relative to the frame 34. In either scenario, the remaining DC power cable 36 can be wrapped around the frame as shown in one of the drawings of FIG. 1. The frame 34 may include features or arms 38 that extend out from the main frame so as to make it easier to wrap the cable 36 around the frame and keep it in place.

FIGS. 3-6 show an alternative embodiment of a power converter 40 that can be engaged with a wall outlet 42. In this case, the pivotable mounting of the frame 44 to the wall plug 46 is located relatively closer to the prongs 48 of the wall plug. Rather than pivoting the wall plug 46 180 degrees so that the prongs 48 are within the interior of the frame 44, the pivotable nature allows the frame 44 to drop into a vertical position while the wall plug 46 is plugged into the vertically-oriented wall outlet 42. This may assist the user by providing the user with more convenient surfaces to grasp in sorting and removing the plug 46 from the wall outlet 42. This may be helpful, as consumer devices are often plugged into power strips or outlets that may be in difficult to reach positions. The converter 40 of FIG. 2 includes features 50 on the frame 44 that can retain the wrapped cable 52 in position and the prongs 48 of the plug 46 can be used to retain the wrapped coils of the cable 52 in position on an opposite end of the frame 44.

As can be appreciated, there are many possible alternatives and modifications of the designs described in FIGS. 1-6. For example, the housing could take nearly any other shape, be composed of different suitable materials, and/or have other features that would make the housing convenient and useful.

Figures 7, 8:
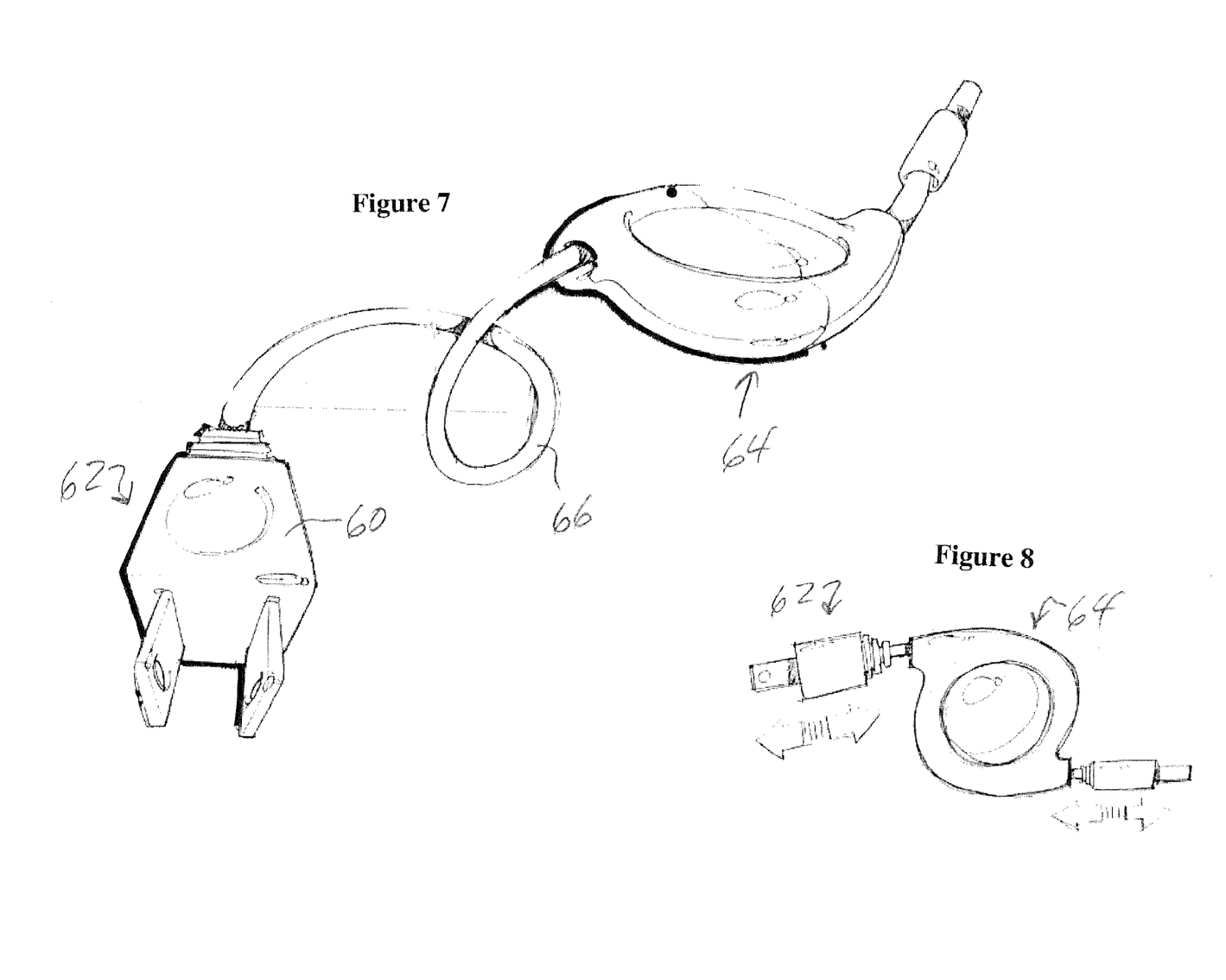
FIG. 7 is a perspective view of a cell phone charger having a cord retraction device thereon.
FIG. 8 is a top view of the charger showing how each of the AC power cord and the DC power cord can be extended from or retracted into a housing thereof.
Figure 9:
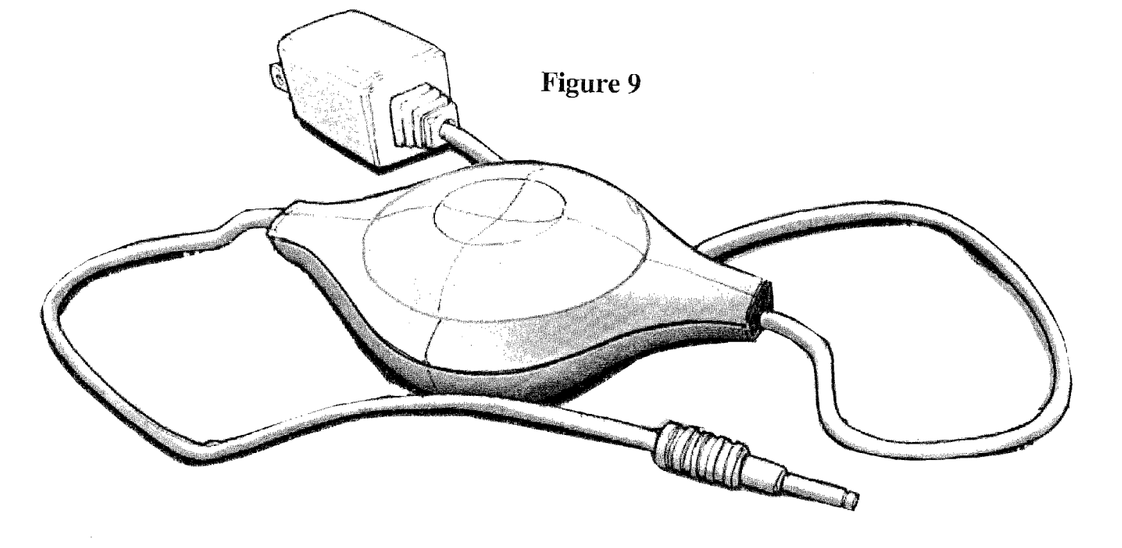
FIG. 9 is a perspective view of an alternative embodiment of a cell phone charger having a cord retraction device thereon.
Figure 10:
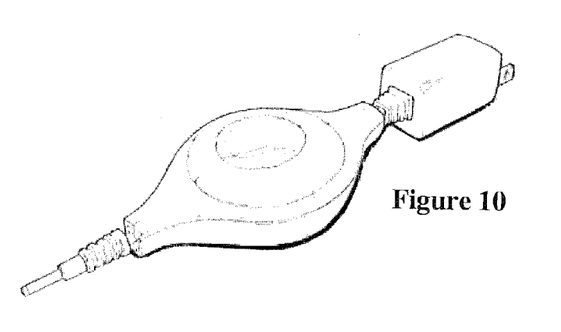
FIG. 10 is a perspective view of the charger of FIG. 9, showing an AC power cord and a DC power cord retracted into a housing thereof.
Figure 11:
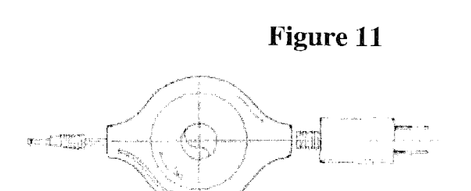
FIG. 11 is a side view of the charger of FIG. 9.
Figure 12:
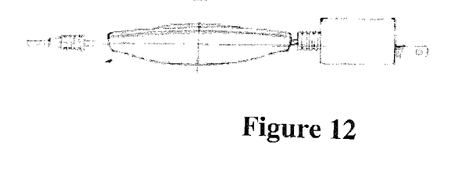
FIG. 12 is a top view of the charger of FIG. 9.
Figures 13, 14:
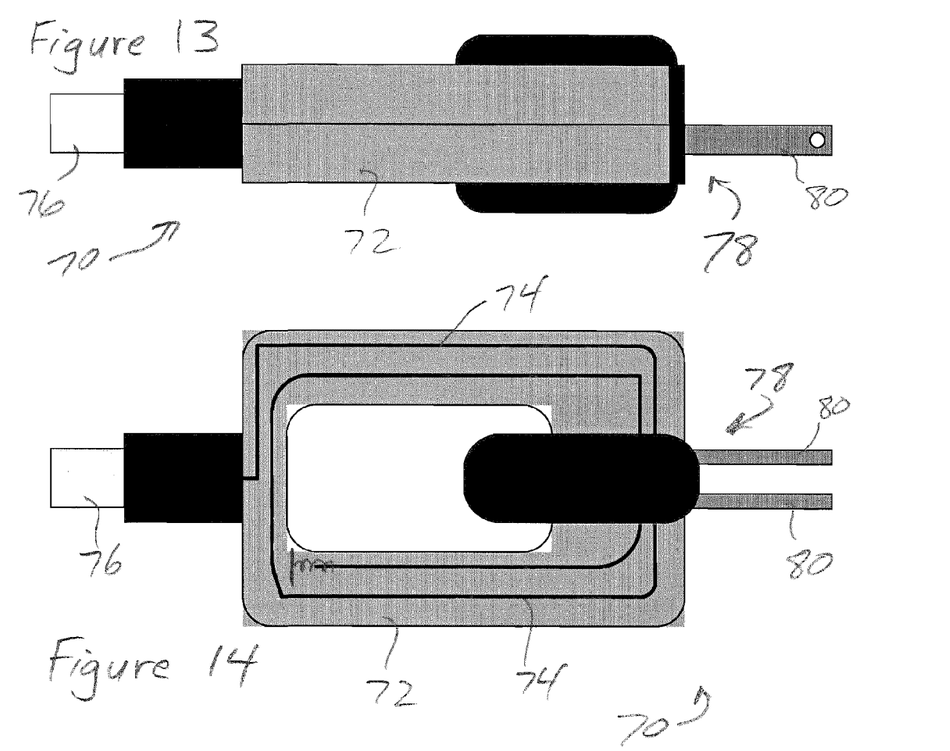
FIG. 13 is a side view of an AC-DC power converter, shown in an extended position.
FIG. 14 is a top view of the power converter of FIG. 13, shown in an extended position.
Figure 15:
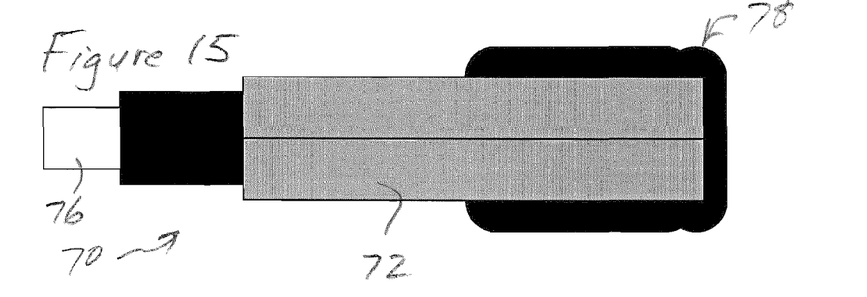
FIG. 15 is a side view of the power converter of FIG. 13, shown in a retracted position.

Another technique for managing the cable associated with the cell phone charger is shown in FIGS. 7 and 8. In this case, a power converter is again contained with a slightly-oversized housing 60 associated with the wall plug 62. A cable retraction device 64, such as a cable reel, is located on a DC power cable 66 as shown. The spring-loaded cable reel 64 can retract any unused portion of cable 66 so as to minimize the amount of loose cable when transporting the device as well as to reduce the amount of loose cable when the device is in use.

FIGS. 9-12 show an alternative embodiment of the cable management retraction device of FIGS. 7 and 8. In this case, the differences between the two embodiments are largely cosmetic.

Figure 16:
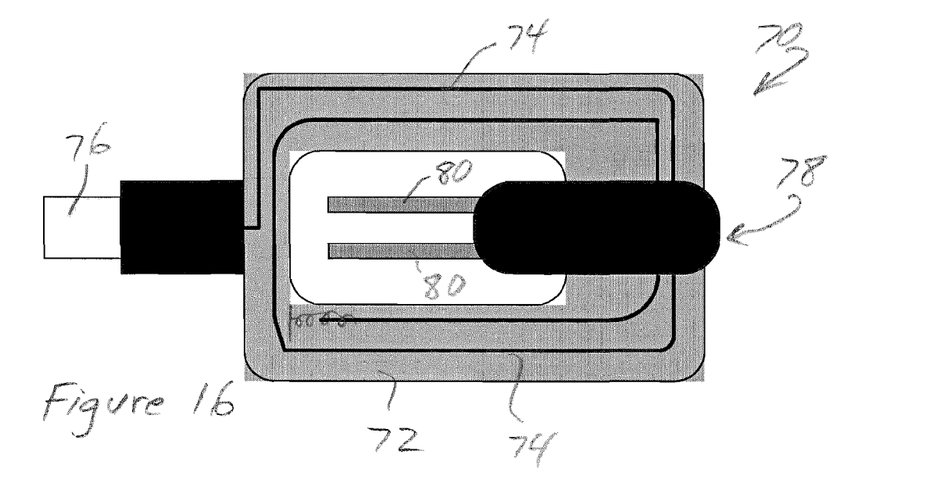
FIG. 16 is a top view of the power converter of FIG. 13, shown in a retracted position.
Figure 17:
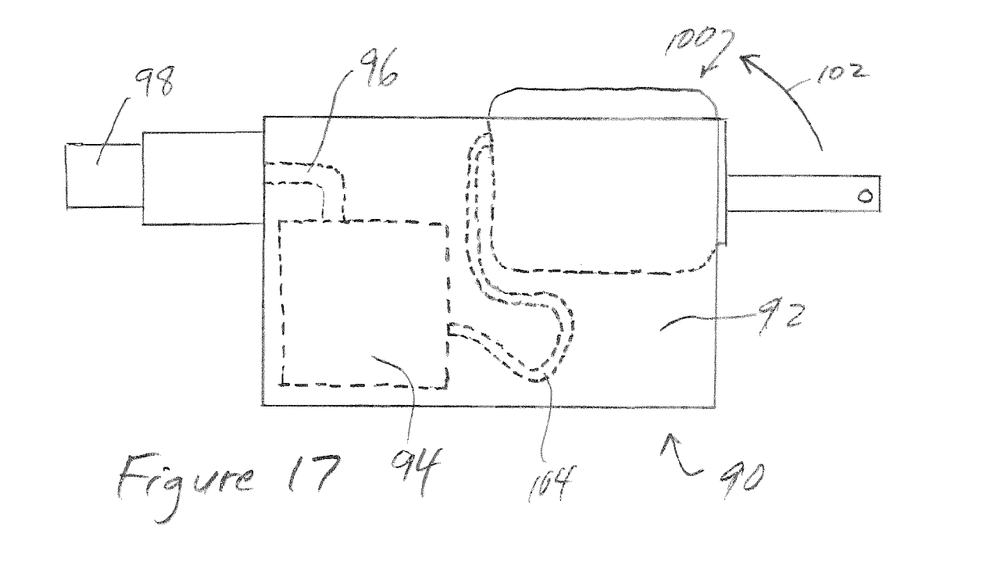
FIG. 17 is a side view of an alternative embodiment of an AC-DC power converter, shown in an extended position and with a cord retraction reel, the remainder of an AC power plug, and cords shown in phantom, and showing the direction that the AC power plug can be pivoted to a retracted position.

FIGS. 13-16 show another embodiment of a power converter 70. In this converter 70, a frame 72 has a retraction device built therein (such as a spring or a conventional retraction reel) that is attached to a DC power cord 74. The DC power cord 74 has a DC power plug 76 at an end thereof, the DC power plug being suitable for connection to a mobile device such as a mobile telephone or laptop computer. The frame 72 also has an AC power plug 78 pivotably attached thereto. This pivotable mounting allows the AC power plug 78 to be pivoted between an extended position in which the prongs 80 of the plug face outward (FIG. 14) (for engagement with an AC power outlet) and a retracted position in which the prongs of the plug face inward (FIG. 16). In this embodiment, the retracted DC power cord 74 may pass through the pivot point of the AC power plug 78.

In another embodiment somewhat similar to that shown in FIGS. 13-16, a converter 90 includes a frame 92 in which a retraction mechanism 94 is contained therein for resiliently urging a DC power cord 96 into the housing. The cord 96 has a DC power plug 98 at one end thereof. An AC power plug 100 is pivotable mounted to the frame 92 and is pivotable in the direction shown by the arrow 102. The plug 100 is electrically connected to the retraction mechanism 94 by another cord 104. AC-to-DC power conversion circuitry may reside in the AC power plug 100, the retraction mechanism 94, the DC power plug 98, and/or elsewhere in the converter 90. In this case, the retraction mechanism 94 and DC power cord 96 are separate from the AC power plug 100 and are located in a position to allow the plug 100 to pivot without interaction therewith.

Figure 18:
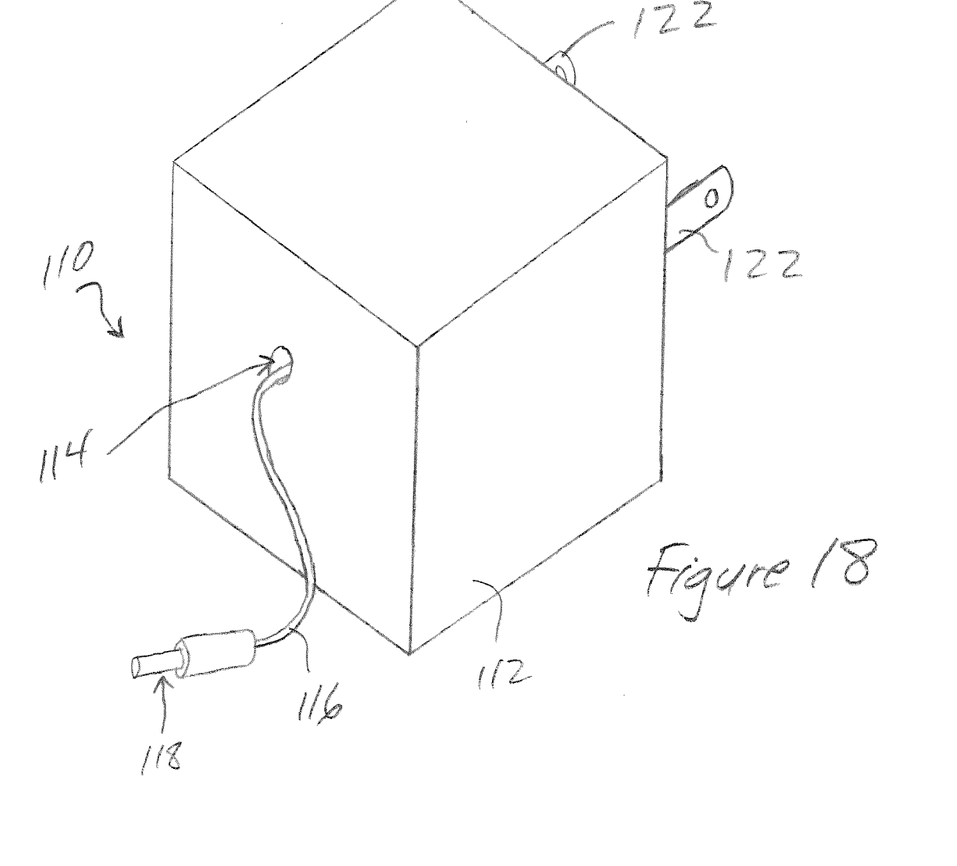
FIG. 18 is a perspective view of another alternative embodiment of an AC-DC power converter, with a DC power cord partially extended therefrom.
Figure 19:
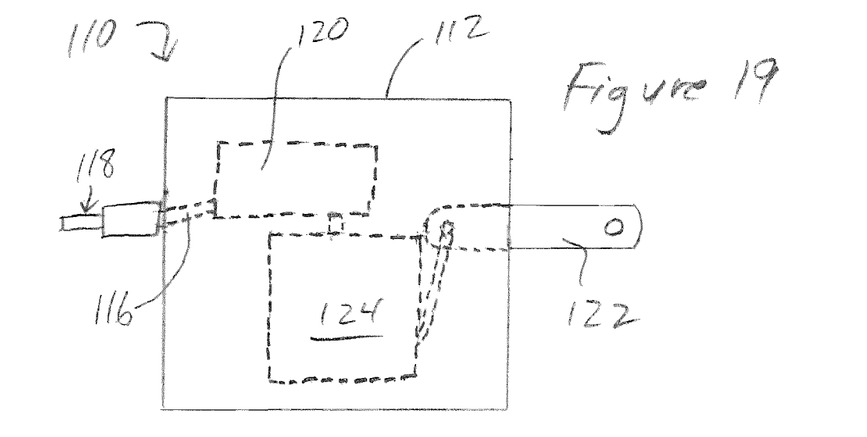
FIG. 19 is a side view of the power converter of FIG. 18 showing a retraction reel, AC-DC power conversion circuitry, the remainder of an AC power prong, and interconnections therebetween in phantom.

Another embodiment of a power converter 110 is shown in FIGS. 18 and 19. This converter is formed as a six-sided box-shaped housing 112 having an opening 114 formed in one wall thereof to allow a DC power cord 116 to pass therethrough. The cord 116 has a DC power plug 118 on one end thereof. Inside of the housing 112 is a retraction mechanism 120 that resiliently urges the DC power cord 116 into the housing. An opposite wall of the housing 112 has at least two AC power prongs 122 extending therethrough for mating with an AC power outlet. Internally in the housing 112, the prongs 122 are electrically connected to AC-DC power conversion circuitry 124, which is in turn connected to the DC power cord 116 within the retraction mechanism 120.

It is believed that the techniques disclosed herein for managing the power cable associated with cell phone chargers have not previously been employed for several reasons. First of all, cell phone chargers are very aggressively priced. Excess materials and features are not typically introduced. In this case, because of the extensive cost savings realized by containing a power converter within the AC wall plug, the possibility of adding convenience features such as those disclosed herein is now possible. Second, previous cell phone chargers included large housings to contain the power converter and on a relative basis, the power cord may not have presented as much of a nuisance as did the large housing. Now that the large housing has been virtually eliminated, the relative nuisance of the power cable has increased and is now addressed.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein. It is therefore intended that the following appended claims and claims hereafter introduced are interpreted to include all such variations, modifications, permutations, additions, and sub-combinations as are within their true spirit and scope.

What is claimed is:

1. An AC-to-DC power converter, comprising:
   an AC power plug having AC power prongs extending therefrom, the prongs adapted for mating engagement with an AC power outlet;
   a cord housing to which the AC power plug is pivotably attached allowing the AC power plug to pivot about an axis between an extended position in which the AC power prongs face outward from the cord housing and a retracted position in which the AC power prongs face inward and further allowing the AC power plug to pivot about the axis an angular extent of 360 degrees, wherein the cord housing includes a frame defining a central void into which the prongs are received when the AC power plug is pivoted sufficiently, and wherein the DC power cord is retracted into the cord housing around the central void;
   a DC power cord having a DC power plug at one end thereof, adapted for mating engagement with a DC power inlet;
   a retraction mechanism attached to the DC power cord that resiliently urges the DC power cord into the housing; and
   AC-to-DC power conversion circuitry electrically connected between the AC power plug and the DC power cord, wherein the AC-to-DC power conversion circuitry is located within the AC power plug.

2. A power converter as defined in claim 1, wherein the retraction mechanism includes retraction of the DC power cord through the pivot axis in the AC power plug.

3. A power converter as defined in claim 1, wherein the retraction mechanism is separated from the AC power plug.

4. An AC-to-DC power converter, comprising:
   a housing;
   a DC power cord having a DC power plug at one end thereof, adapted for mating engagement with a DC power inlet;
   an AC power plug pivotably attached to the housing, with AC power prongs extending from the AC power plug, the prongs adapted for mating engagement with an AC power outlet, wherein the housing includes a frame defining a central void into which the prongs are received when the AC power plug is pivoted sufficiently, and wherein the DC power cord is retracted into the housing around the central void;
   a retraction mechanism within the housing that resiliently urges the DC power cord into the housing; and
   AC-to-DC power conversion circuitry located within the AC power plug, the circuitry electrically connected between the AC power prongs and the DC power plug.

5. A power converter as defined in claim 1, wherein the DC power cord is resiliently urged into the cord housing by a spring-loaded mechanism.

6. A power converter as defined in claim 1, wherein the extended position is offset an angular extent of 180 degrees from the retracted position.

7. A power converter as defined in claim 4, wherein the AC power plug is pivotable an angular extent of 360 degrees.

8. A power converter as defined in claim 4, wherein the AC power plug is pivotable an angular extent of 180 degrees.

9. An AC-to-DC power converter, comprising:
   an AC power plug having AC power prongs extending therefrom, the prongs adapted for mating engagement with an AC power outlet;
   a cable management device outside of the AC power plug to which the AC power plug is pivotally attached, wherein the cable management device includes a frame defining a central void into which the prongs are received when the AC power plug is pivoted sufficiently;
   a DC power cord engagable with the cable management device, the DC power cord having a DC power plug adapted for mating engagement with a DC power inlet at one end thereof, and wherein the DC power cord is retracted into the cable management device around the central void; and
   AC-to-DC power conversion circuitry electrically connected between the AC power prongs and the DC power cord and located within the AC power plug.

10. A power converter as defined in claim 9, wherein the cable management device comprises a housing into which the DC power cord is resiliently urged.

11. A power converter as defined in claim 10, wherein the DC power cord is resiliently urged into the housing by a spring loaded mechanism.

12. A power converter as defined in claim 9, wherein the cable management device is a frame about which the DC power cord may be manually wound.

* * * * *